(12) United States Patent
Toyota et al.

(10) Patent No.: US 7,487,998 B2
(45) Date of Patent: Feb. 10, 2009

(54) FUEL TANK ARRANGEMENT STRUCTURE FOR VEHICLE

(75) Inventors: Minoru Toyota, Fuchu-cho (JP); Akira Ito, Fuchu-cho (JP); Kazue Sumida, Fuchu-cho (JP); Yoshitaka Inoue, Fuchu-cho (JP)

(73) Assignee: Mazda Motor Corporation (JP)

( * ) Notice: Subject to any disclaimer, the term of this patent is extended or adjusted under 35 U.S.C. 154(b) by 338 days.

(21) Appl. No.: 11/261,475

(22) Filed: Oct. 31, 2005

(65) Prior Publication Data

US 2006/0097507 A1 May 11, 2006

(30) Foreign Application Priority Data

Nov. 10, 2004  (JP)  ............................. 2004-326039
Nov. 12, 2004  (JP)  ............................. 2004-328944

(51) Int. Cl.
*B63H 11/00* (2006.01)
(52) U.S. Cl. ....................................... 280/834
(58) Field of Classification Search ................ 280/834
See application file for complete search history.

(56) References Cited

U.S. PATENT DOCUMENTS

| | | | | |
|---|---|---|---|---|
| 1,492,744 A | * | 5/1924 | Poarch | 137/266 |
| 4,627,656 A | | 12/1986 | Gokimoto et al. | |
| 6,974,156 B2 | * | 12/2005 | Kosuge et al. | 280/831 |
| 7,073,824 B2 | * | 7/2006 | Uhara et al. | 280/834 |
| 2004/0099465 A1 | | 5/2004 | Matsumoto et al. | |

FOREIGN PATENT DOCUMENTS

| | | | |
|---|---|---|---|
| EP | 0 903 254 A2 | | 3/1999 |
| JP | 08127257 A | * | 5/1996 |
| JP | 09-086245 | | 3/1997 |
| JP | 2001-063389 | | 3/2001 |
| JP | 2001063389 | | 3/2001 |
| JP | 2001-138753 | | 5/2001 |

OTHER PUBLICATIONS

European Search Report dated Aug. 1, 2006.

* cited by examiner

*Primary Examiner*—Kevin Hurley
(74) *Attorney, Agent, or Firm*—Studebaker & Brackett PC; Donald R. Studebaker

(57) ABSTRACT

Disclosed is a fuel tank arrangement structure for a vehicle, which is designed to position a fuel tank 30 under a floor panel 4 forming a floor of a passenger compartment of the vehicle. In the fuel tank arrangement structure, at least a laterally inward portion of the floor panel 4 is formed as a convex floor portion 7 protruding upward from a general surface 8 of the floor panel 4, and at least a laterally inward portion of the fuel tank 30 is formed as a convex fuel-tank portion 30a protruding upward. The convex fuel-tank portion 30a is positioned within a space defined by the convex floor portion 7 while positioning the remaining portion of the fuel tank 30 at a height position lower than the general surface 8 of the floor panel 4, and a seat 9 (10) is positioned inside the passenger compartment and above the convex floor portion 7.

8 Claims, 16 Drawing Sheets

FUEL TANK ARRANGEMENT STRUCTURE FOR VEHICLE

BACKGROUND OF THE INVENTION

1. Field of the Invention

The present invention relates to a fuel tank arrangement structure for a vehicle, which is designed to position a fuel tank under a floor panel (including a rear floor) forming a floor of a passenger compartment of the vehicle.

2. Description of the Prior Art

Heretofore, a vehicle fuel tank has been typically positioned rearward relative to a kick-up portion and under a rear floor. In this context, design requirements for vehicles generally include ensuring a foot space for a passenger seated in a rear seat, and ensuring a capacity of a fuel tank.

While the rear-seat passenger's foot space is determined by a frontward/rearward or longitudinal position of a kick-up portion, an arrangement design therefore involves an antinomic problem that a kick-up portion displaced rearward (or in a rearward direction of a vehicle) to provide a wider foot space causes difficulty in ensuring a sufficient fuel tank capacity, and a kick-up portion displaced frontward (or in a frontward direction of the vehicle) to provide a larger fuel tank capacity causes difficulty in ensuring a sufficient foot space.

Japanese Patent Laid-Open Publication No. 2001-63389 discloses a structure where a fuel tank is positioned rearward relative to a kick-up portion and under a rear floor. This structure is designed to form a downward protruding convex portion in each of the rear floor and a seat cushion of a rear seat placed on the rear floor and correspondingly form a concave portion in a top deck of the fuel tank. Thus, a capacity of the fuel tank is inevitably reduced due to the concave portion to cause a problem about difficulty in ensuring a sufficient fuel tank capacity.

In a structure disclosed in Japanese Patent Laid-Open Publication No. Hei 9-86245, a seat cushion of a rear seat is mounted on a rear floor extending rearward from a kick-up portion, and divided into an upper rear-seat cushion main body and a lower rear-seat cushion divisional portion. The rear floor is formed with a downward protruding concave portion to allow the rear-seat cushion divisional portion to be left on the rear floor when the rear seat is rotated frontward and folded. Thus, if a fuel tank is positioned rearward relative to the kick-up portion and under the rear floor, the concave portion will undesirably hinder the fuel tank from having a sufficient capacity.

In view of the above problems, it is an object of the present invention to provide a vehicle fuel tank arrangement structure capable of satisfying both needs for ensuring a passenger compartment space, particularly a rear-seat passenger's foot space, and ensuring a capacity of a fuel tank, and allowing a dead space particularly on the lower front side of a rear seat to be effectively used as a rear-seat passenger's foot space.

SUMMARY OF THE INVENTION

The present invention provides a fuel tank arrangement structure for a vehicle, which is designed to position a fuel tank under a floor panel forming a floor of a passenger compartment of the vehicle. In the fuel tank arrangement structure, at least a part of a lateral portion of the floor panel is formed as a convex floor portion protruding upward from a general surface of the floor panel, and at least a part of lateral portion of the fuel tank is formed as a convex fuel-tank portion protruding upward. The convex fuel-tank portion is positioned within a space defined by the convex floor portion, and a seat is positioned inside the passenger compartment and above the convex floor portion.

According to the present invention, the floor panel and the fuel tank are formed, respectively, with the convex floor portion protruding upward from the general surface of the floor panel and the convex fuel-tank portion protruding upward, in at least a part of lateral portion thereof, and the convex fuel-tank portion is positioned within the space defined by the convex floor portion. Further, a seat is positioned inside the passenger compartment and above the convex floor portion. Thus, the fuel tank arrangement structure of the present invention has advantages of being able to satisfy both needs for ensuring a passenger compartment space, particularly a rear-seat passenger's foot space, and ensuring a capacity of a fuel tank, and allow a dead space particularly on the lower front side of a rear seat to be effectively used as a rear-seat passenger's foot space.

DESCRIPTION OF THE PREFERRED EMBODIMENT

Figure 1:
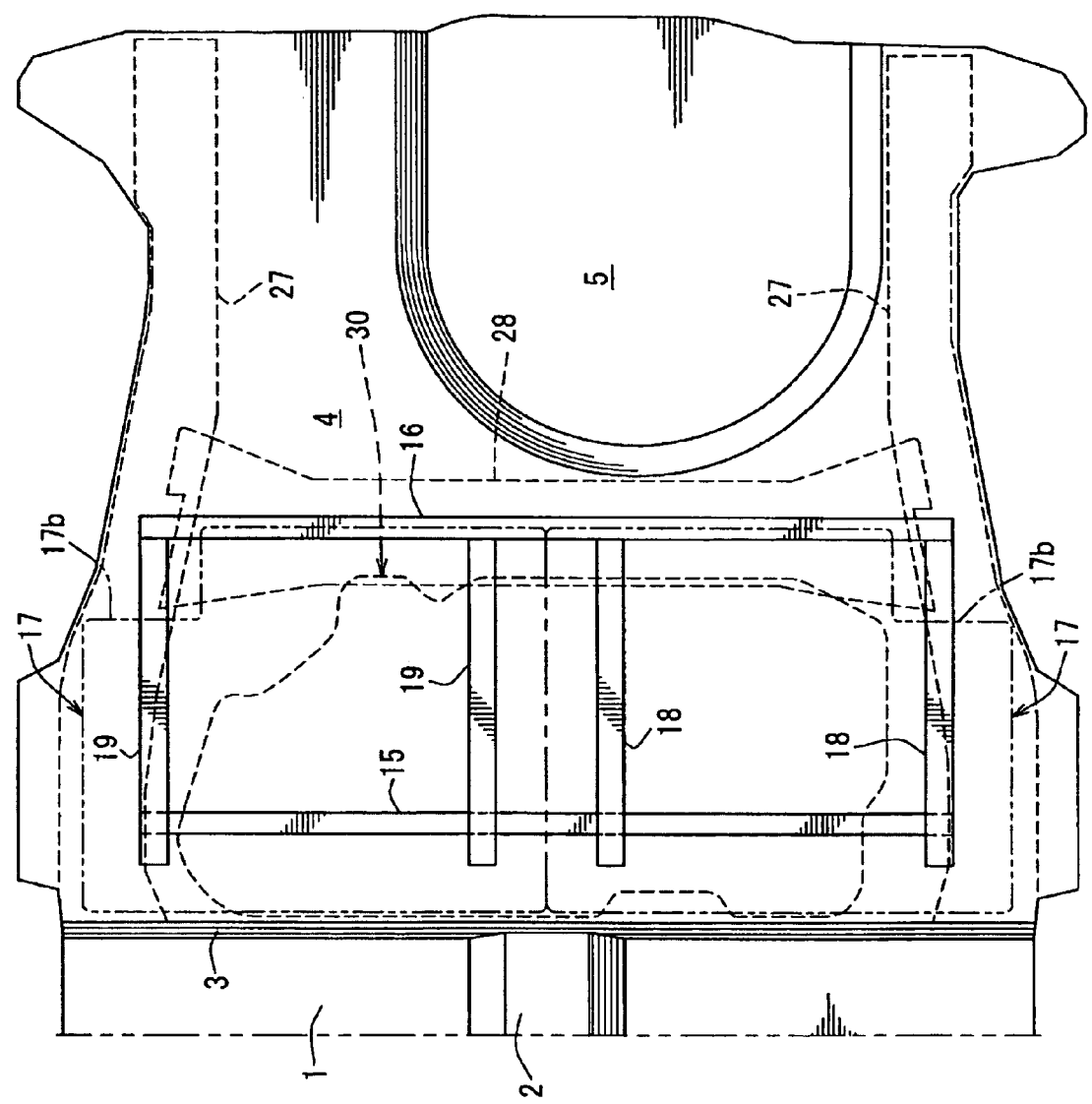
FIG. 1 is a top plan view showing a fuel tank arrangement structure for a vehicle, according to one embodiment of the present invention.

With reference to the drawings, an embodiment of the present invention will now be described in detail.

Firstly, the structure of a vehicle body associated with a fuel tank arrangement structure for a vehicle, according to one embodiment of the present invention, will be described primarily with reference to FIGS. 1 to 4.

A floor panel (front floor panel) 1 forming a floor for a passenger compartment of a vehicle has a central portion formed as a tunnel portion 2 which protrudes toward the passenger compartment and extends longitudinally or in frontward and rearward directions of the vehicle. Further, a pair of side sills (not shown) each having a closed cross section and extending in the frontward and rearward directions of the vehicle are fixedly joined, respectively, to opposite lateral edges of the floor panel 1.

A rear floor (rear floor panel) 4 is integrally formed with or integrally connected to the floor panel 1 through a kick-up portion 3 extending upward to form a step at a top end thereof. The rear floor 4 has a rear portion stepped downward to form a concave-shaped spare tire housing 5.

More specifically, the kick-up portion 3 rises obliquely with a front-low and rear-high profile to form a cross-sectionally L-shaped step region 6 at a top end thereof, and a convex rear-floor portion 7 is formed adjacent to the step region 6. That is, the step region 6 having a small dimension is formed between the kick-up portion 3 and the convex rear-floor portion 7 to serve as a means to provide enhanced rigidity of the floor.

Figure 2:
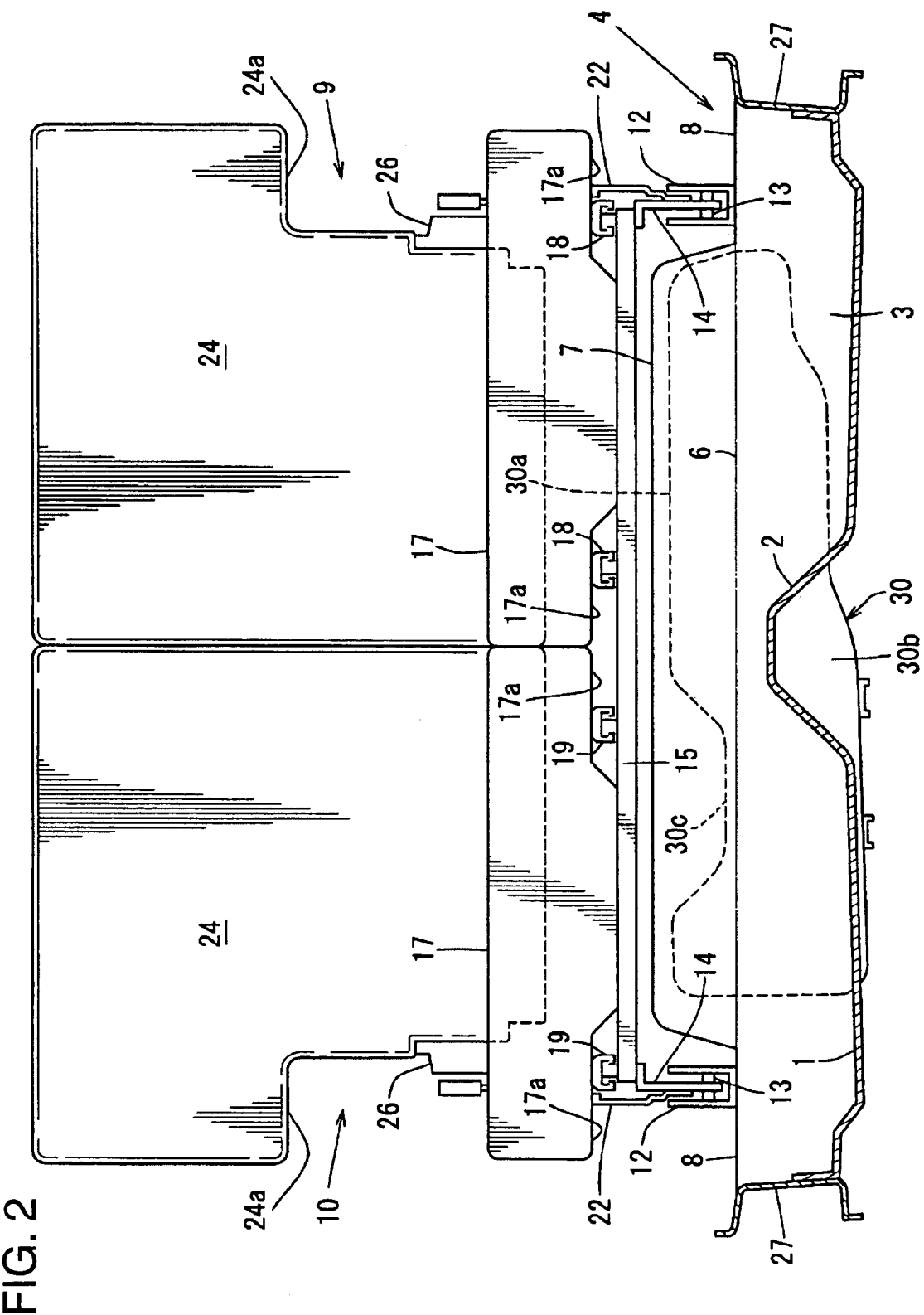
FIG. 2 is a front view of the fuel tank arrangement structure.

As shown in FIG. 2, the convex rear-floor portion 7 is formed by extending a surface of the rear floor 4 upward, over approximately the entire width or lateral length of the rear floor 4 while partly leaving the original surface of the rear floor 4 on each of right and left (in FIG. 2) sides of the convex rear-floor portion 7 at a given width or lateral length (these right and left original surface regions 8, 8 of the rear floor 4 will hereinafter be referred to as "general surface").

Figure 3:
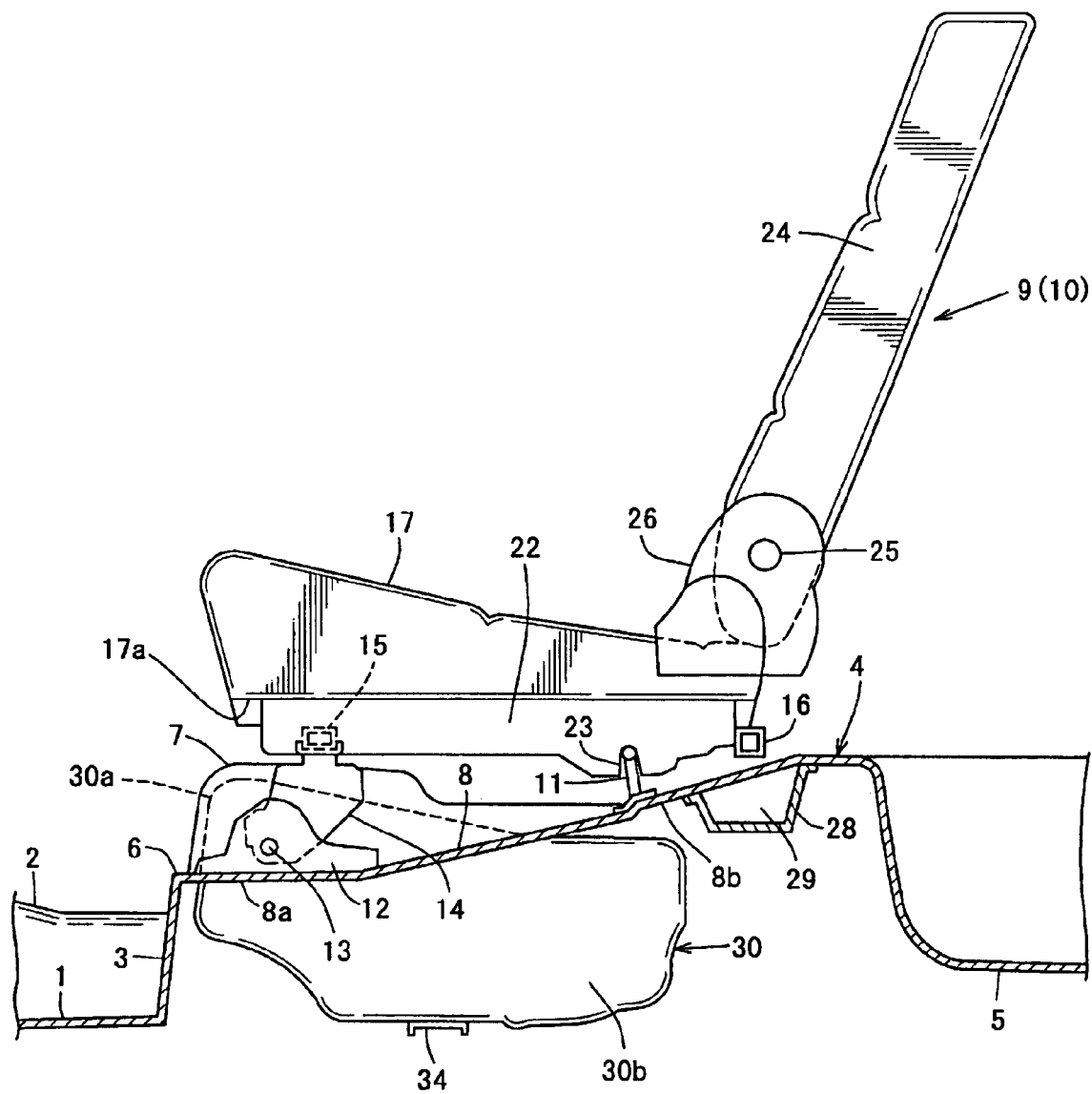
FIG. 3 is a side view of the fuel tank arrangement structure.

As shown in FIG. 3, each of the right and left general surfaces 8, 8 is formed to have a slant region inclined downward in the frontward direction, specifically inclined with a front-low and rear-high profile, a lower horizontal front region 8a on the frontward side of the slant region, and a higher rear region 8b on the rearward side of the slant region. As illustrated in this figure, the lower horizontal front region 8a is used for supporting each front portion of a pair of right and left (in FIG. 2) rear seats 9, 10, and the higher rear region 8b is used for supporting each rear portion of the rear seats 9, 10 through a striker 11.

More specifically, as shown in FIGS. 2 and 3, a pair of right and left (in FIG. 2) fixed brackets (rear-seat mounting means) 12, 12 are fixedly attached, respectively, onto top surfaces of the lower horizontal front regions 8a, 8a of the general surfaces 8, 8. Each of the fixed brackets 12, 12 rotatably supports a movable bracket (rear-seat mounting means) 14 through a pivot shaft 13. Further, a seat support frame 15 formed of a rigid member is disposed to extend laterally (or in a width direction of the vehicle) so as to bridge between respective top ends of the pair of right and left (in FIG. 2) movable brackets 14, 14.

As seen in FIG. 2, the seat support frame 15 extends laterally to stride over the convex rear-floor portion 7, and opposite lateral ends of the seat support frame 15 are mounted, respectively, to the general surfaces 8, 8 of the rear floor 4 through the two sets of the brackets 14, 12 and pivot shaft 13.

The seat support frame 15 is a rigid member extending laterally above the convex rear-floor portion 7 in spaced apart relation to the convex rear-floor portion 7, as shown in FIG. 2. In this embodiment, the seat support frame 15 is formed of a metal square pipe, and the opposite lateral ends of the seat support frame 15 are mounted, respectively, to the general surfaces 8, 8 of the rear floor 4. The seat support frame 15 may be formed of a hydroformed product in place of the metal square pipe.

As shown in FIG. 1, a rear-side seat support frame 16 is disposed at a rearward position relative to the above or front-side seat support frame 15 to extend in spaced-apart and parallel relation to the front-side seat support frame 15. A pair of seat slide rails 18, 18 serving as a seat slider are attached between the front-side and rear-side seat support frames 15, 16 in association with a seat cushion 17 of the left rear seat 9, and a pair of seat slide rails 19, 19 serving as a seat slider are attached between the front-side and rear-side seat support frames 15, 16 in association with a seat cushion 17 of the right rear seat 10.

The pairs of seat slide rails 18, 19 are provided as means to support the right and left rear seats 9, 10 in such a manner that they are moved slidably in the frontward and rearward directions separately or independently.

Each of the right and left seat cushions 17, 17 has a bottom surface formed with a pair of notched regions 17a, 17a at opposite lateral ends thereof. Each of the notched regions 17a, 17a provides a space for reliably arranging a corresponding one of the seat slide rails 18, 19.

Figure 4:
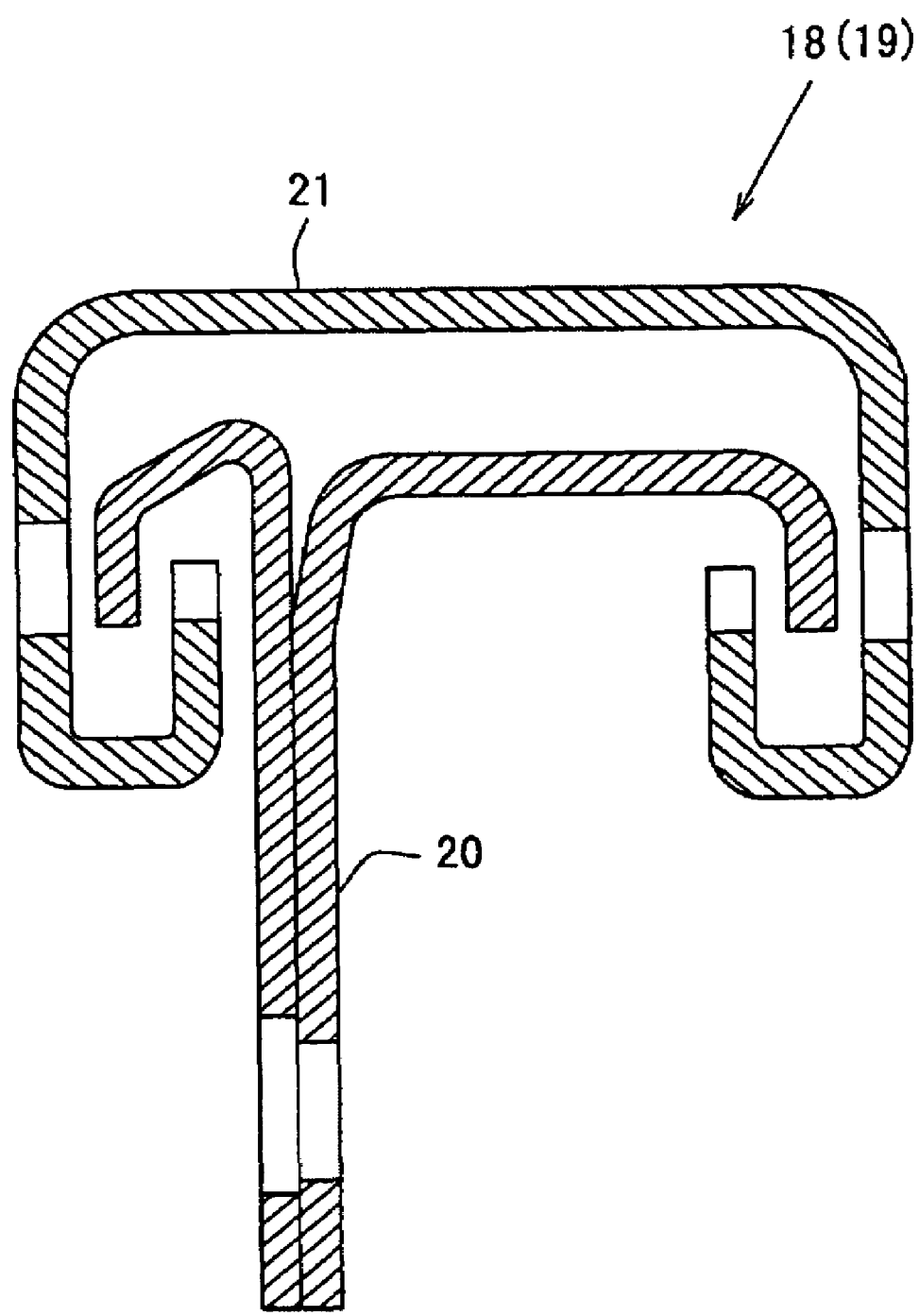
FIG. 4 is an enlarged sectional view of a seat slide rail in the fuel tank arrangement structure.

As shown in FIG. 4, each of the seat slide rails 18, 19 comprises a lower rail 20 formed by joining two members together, and an upper rail 21 formed by bending a single member. The seat slide rails 18, 19 are attached to the front-side and rear-side seat support frame 15, 16 to extend longitudinally (or in the frontward and rearward directions of the vehicle) in parallel relation to each other, as shown in FIG. 1. More specifically, the seat slide rails 18, 19 are designed such that each of the four lower rail 20 has front and rear ends which are fixedly attached, respectively, to the front-side and rear-side seat support frames 15, 16 so as to allow a corresponding one of the four upper rails 21 to be slidingly moved in the frontward and rearward directions of the vehicle.

Further, as shown in FIGS. 2 and 3, a seat side frame 22 is fixed to the bottom surface of each of the seat cushions 17, 17 to extend from the front-side seat support frame 15 to the rear-side seat support frame 16 on the outward side of the movable brackets 14, 14.

As shown in FIG. 3, the seat side frame 22 is formed with an insertion portion 23 for receiving therein the aforementioned striker 11. The insertion portion 23 is provided with a latch (not shown) detachably engageable with the striker 11.

Figure 14:
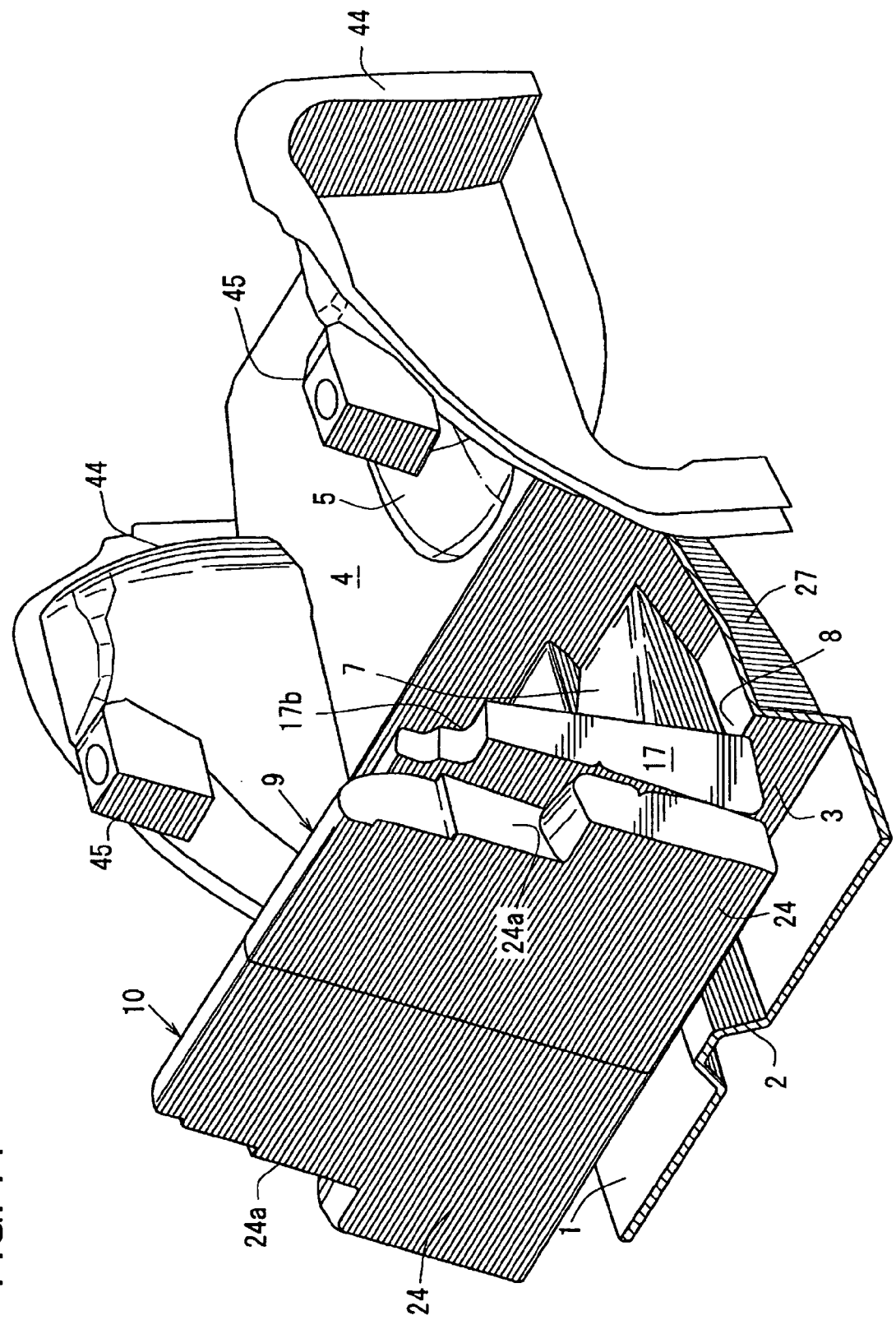
FIG. 14 is perspective view of the fuel tank arrangement structure, wherein the rear seats are moved in a frontward direction of the to a storage position.
Figure 15:
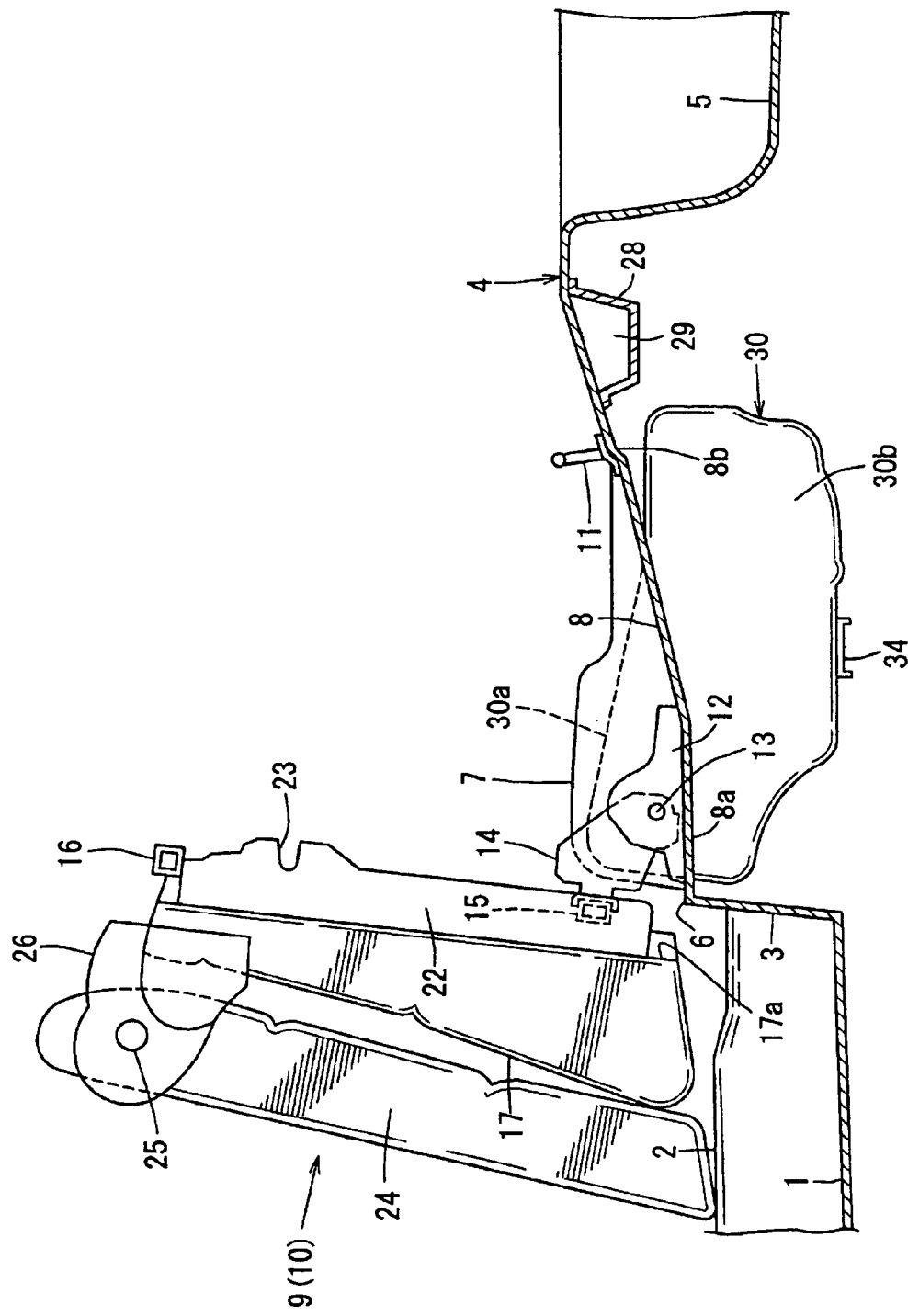
FIG. 15 is a side view of FIG. 14.

As above, the front-side and rear-side seat support frames 15, 16 are combined with the four seat slide rails 18, 19 to form a lattice-like shape, as shown in FIG. 1. Further, the front-side seat support frame 15 is mounted to the respective lower front regions of the general surfaces 8, 8 through the sets of the movable bracket 14, the pivot shaft 13 and the fixed bracket 12, in a rotatable manner, and the rear-side seat support frame 16 is mounted to the higher rear region 8b of the rear floor 4 through the seat side frame 22 and the striker 11, in a detachable manner, as shown in FIGS. 2 and 3. That is, this vehicle body structure is designed to allow each of the rear seats 9, 10 to be moved or rotated in the frontward direction and stored in a folded state, as shown in FIGS. 14 and 15.

Each of the pair of right and left rear seats 9, 10 is fixedly attached onto the upper rails 21 of the seat slide rails 18, 19 supported by the front-side and rear-side seat support frames 15, 16. Each of the rear seats 9, 10 comprises the seat cushion 17 and a seatback 24. The right and left seatbacks 24, 24 are designed to be reclined frontward toward the seat cushion 17 independently in a foldable manner through a reclining knuckle lock mechanism 26 having a reclining pivot point 25.

Each of the seat cushions 17, 17 has a laterally outward side surface with a rear end region formed as a concave portion 17a for avoiding interference with a wheel house 44 (see FIGS. 11 to 14), as shown in FIG. 1. Each of the seatbacks 24, 24 also has a laterally outward side surface with a lower end region formed as a concave portion 24a for avoiding interference with a suspension tower 45 (see FIGS. 11 to 14) and the wheel house 44, as shown in FIG. 2.

As shown in FIGS. 1 and 2, a pair of right and left (in FIG. 2) rear side frames 27, 27 each extending from the hick-up portion toward a rear edge of the rear floor 4 are joined, respectively, along opposite lateral edges of a bottom surface of the rear floor 4 to form two longitudinally extending closed cross-sections therebetween so as to serve as a member for providing enhanced rigidity of the vehicle body. Further, the rear side frames 27, 27 are connected to one another through a rear cross member 28 (so-called No. 4 cross member) extending laterally (or in the width direction of the vehicle) to form a laterally extending cross-section therebetween, as shown in FIG. 3.

Figure 5:
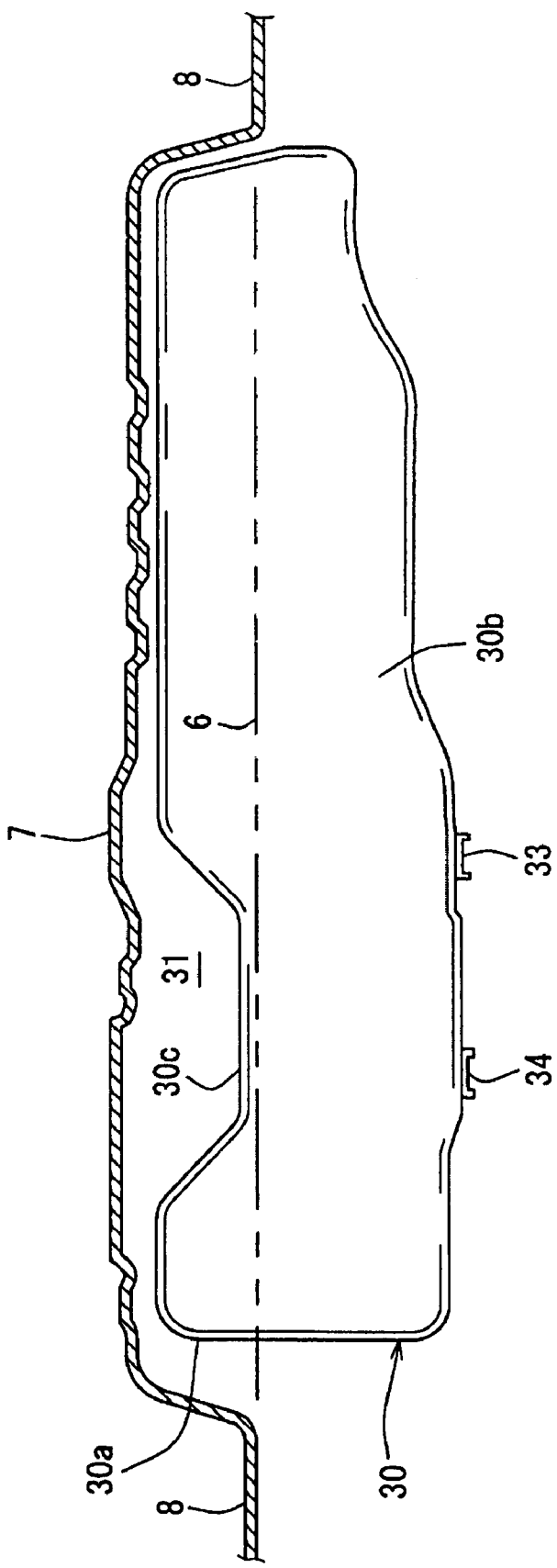
FIG. 5 is a front view showing configurations associated with a convex floor portion and a convex fuel-tank portion in the fuel tank arrangement structure.
Figure 6:
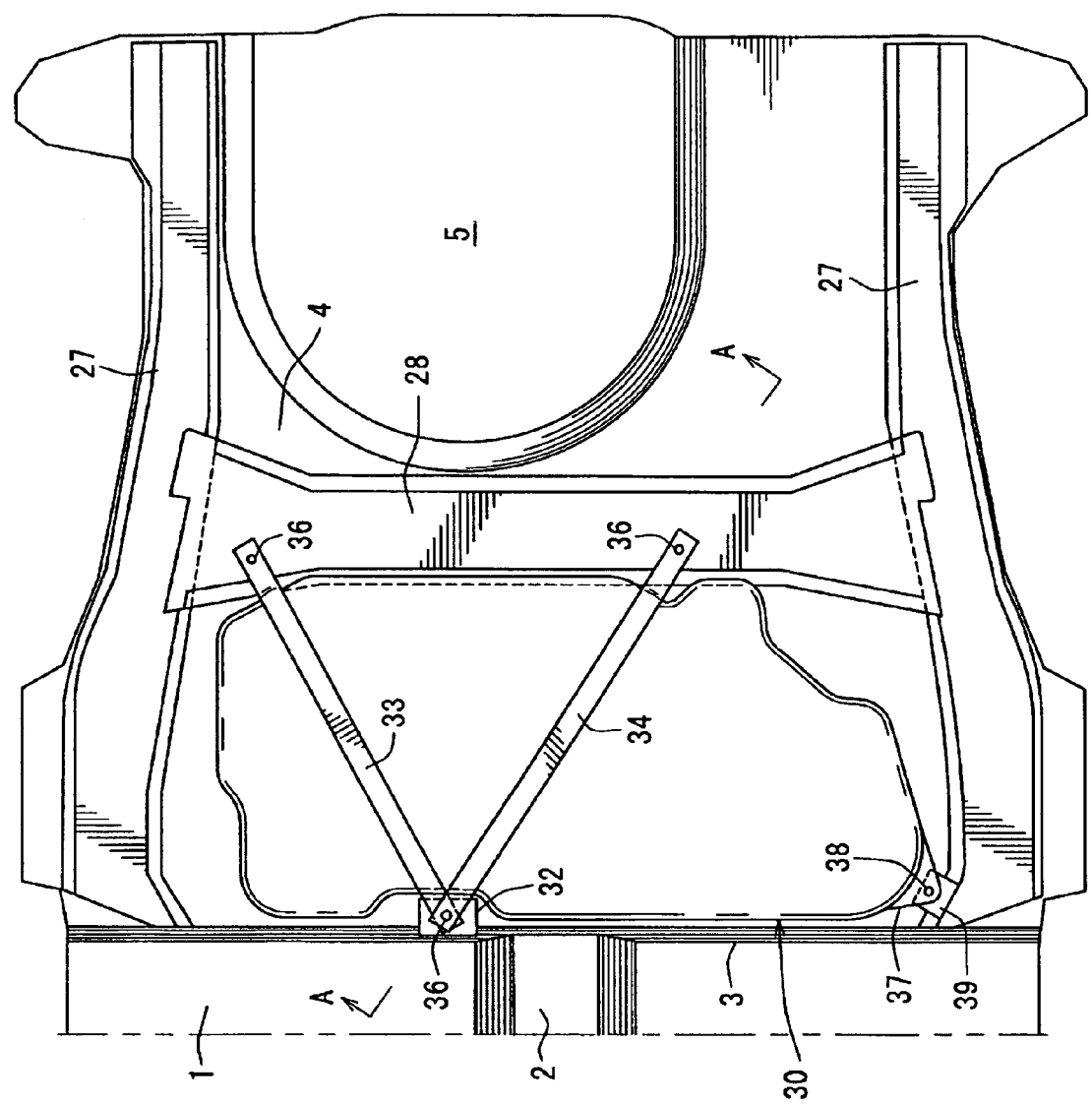
FIG. 6 is a bottom view of FIG. 1.
Figure 7:
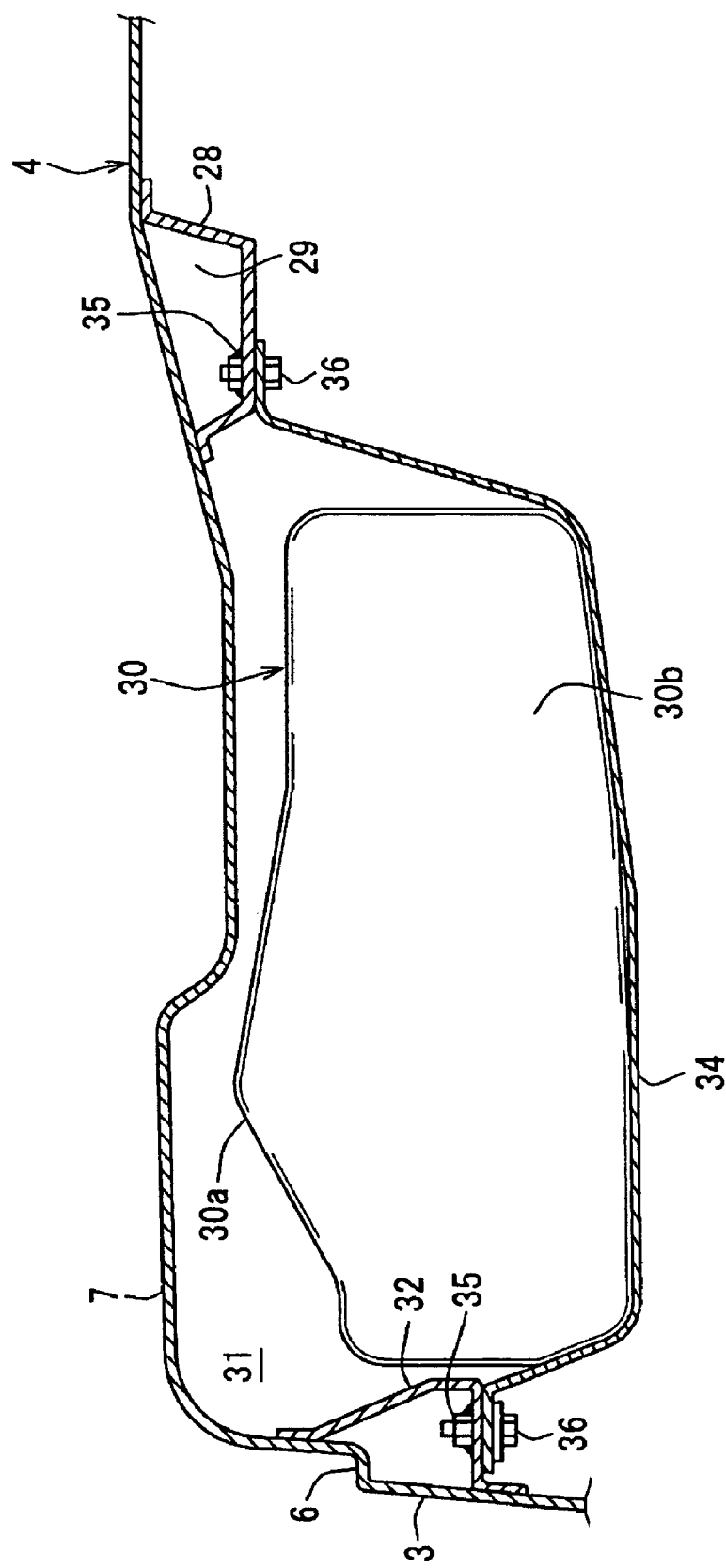
FIG. 7 is a sectional view taken along the line A-A in FIG. 6.

Secondly, the structure of a fuel tank associated with the fuel tank arrangement structure according to this embodiment of the present invention will be described primarily with reference to FIGS. 1 to 3 and FIGS. 5 to 7, wherein FIGS. 5, 6 and 7 are, respectively, a front view showing the structure of the fuel tank, a bottom view of FIG. 1 and a sectional view taken along the line A-A in FIG. 6.

As shown in these figures, a fuel tank 30 is positioned only in a space located rearward relative to the kick-up portion 3 and under the floor panel 4. As is clearly shown in FIG. 5, the fuel tank 30 is integrally formed with a convex fuel-tank portion 30a protruding upward (a portion protruding upward relative to the general surface 8 of the rear floor 4 in FIG. 5). That is, the fuel tank 30 is designed such that a main or primary portion 30b (a portion below the two-dot chain line in FIG. 5) is positioned at a height position lower than the general surface 8 of the rear floor 4, and the convex fuel-tank portion 30a is formed to protrude upward from this primary portion 30b so as to ensure a sufficient fuel-tank capacity.

Specifically, the convex fuel-tank portion 30a is positioned within a space 31 defined by the convex rear-floor portion 7. In this embodiment, as shown in FIG. 5, the convex fuel-tank portion 30a is formed over approximately the entire width or lateral length of the fuel tank 30 in conformity to a lateral length of the space 31, except for a concave-shaped fuel-pump mounting portion 30c, to provide a larger fuel-tank capacity.

The fuel tank 30 is supported as shown in FIGS. 6 and 7. Specifically, a bracket 32 is joined to respective outer surfaces of the kick-up portion 3 and the convex rear-floor portion 7 to vertically bridge therebetween at a position adjacent to the tunnel portion 2 in the width or lateral direction of the vehicle. Then, the fuel tank 30 is supported using the bracket 32 and first and second tank bands 33, 34 to be fastened to the rear cross member 23.

The first tank band 33 has a front end to be detachably fastened to the bracket 32, and a rear end to be detachably fastened to the rear cross member 28 at a position adjacent to one of opposite lateral ends thereof. The second tank band 34 has a front end to be detachably fastened to the bracket 32, and a rear end to be detachably fastened to the rear cross member 28 at a laterally intermediate position thereof. Three nuts 35 pre-welded to the bracket 32 and the rear cross member 28, and three bolts 36 to be threadingly engaged with the respective nuts 35 are used as fastening means.

The first and second tank bands 33, 34 are fastened in combination to form a V shape having an opening on the rearward side in bottom view.

Further, a support piece 37 is integrally formed at or integrally attached to a right (in FIG. 6) front corner of the fuel tank 30 which is located at a position farthest from the bracket 32. This support portion 37 is detachably attached to a convex piece 39 fixed to the rear side frame 27 using an attaching member, such as a bolt or nut.

Figure 8:
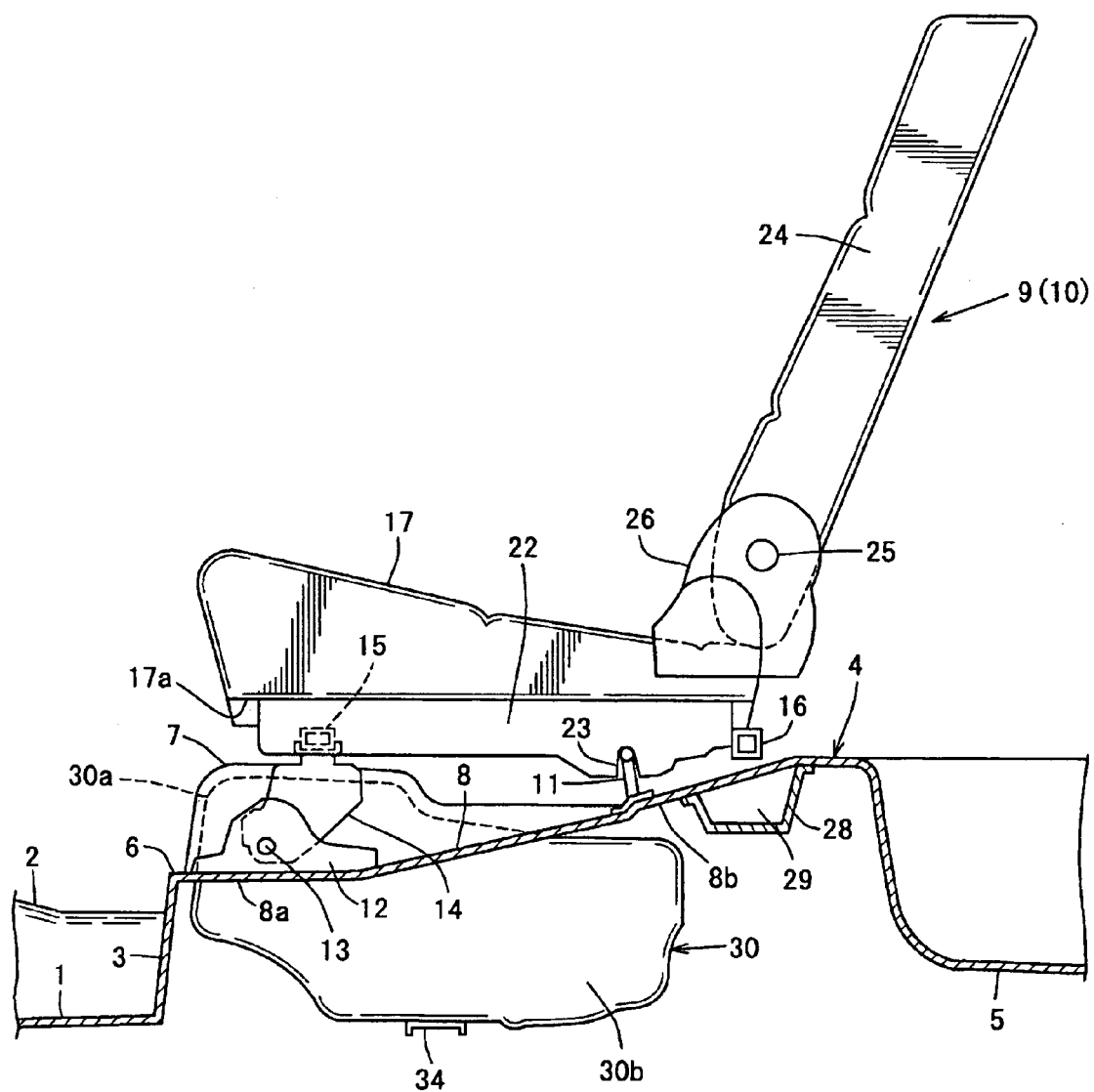
FIG. 8 is a side view showing one modification of the convex fuel-tank portion.

Instead of a vertical-sectional shape (inclined with a front-high and rear-low profile) in FIG. 3, the convex fuel-tank portion 30a of the fuel tank 30 may be formed to have a trapezoidal-shaped portion with a given longitudinal length extending along a shape of a bottom surface of the convex rear-floor portion 7, in side view, so as to further increase the fuel-tank capacity, as shown in FIG. 8.

Figure 9:
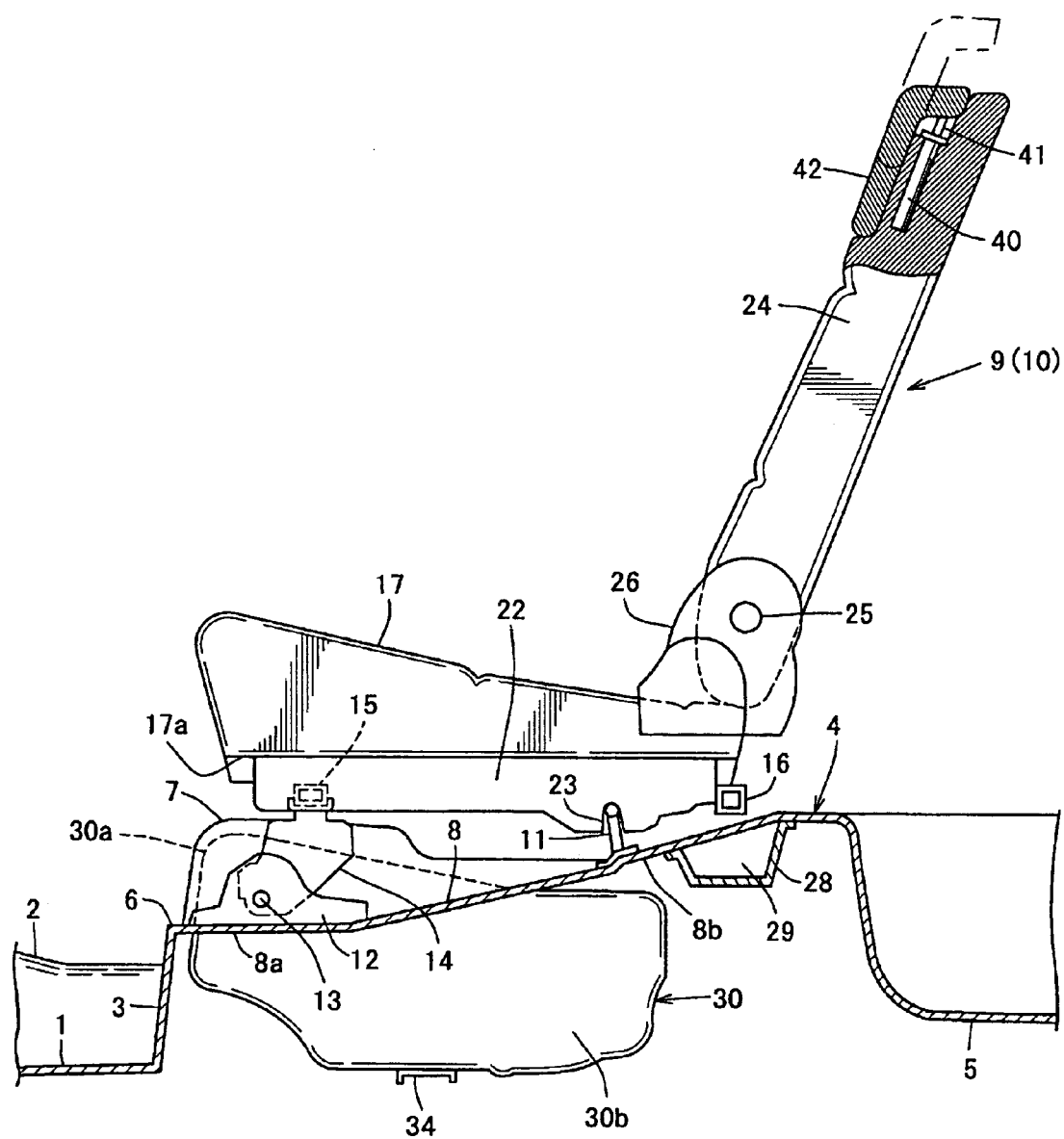
FIG. 9 is a side view showing one modification of a rear seat in the fuel tank arrangement structure.

Further, as shown in FIG. 9, each of the rear seats 9, 10 may include a headrest 42 attached to an upper portion of the seatback 24 thereof in a vertically adjustable and detachable manner using a pole guide 40 and a headrest pole 41.

Figure 10:
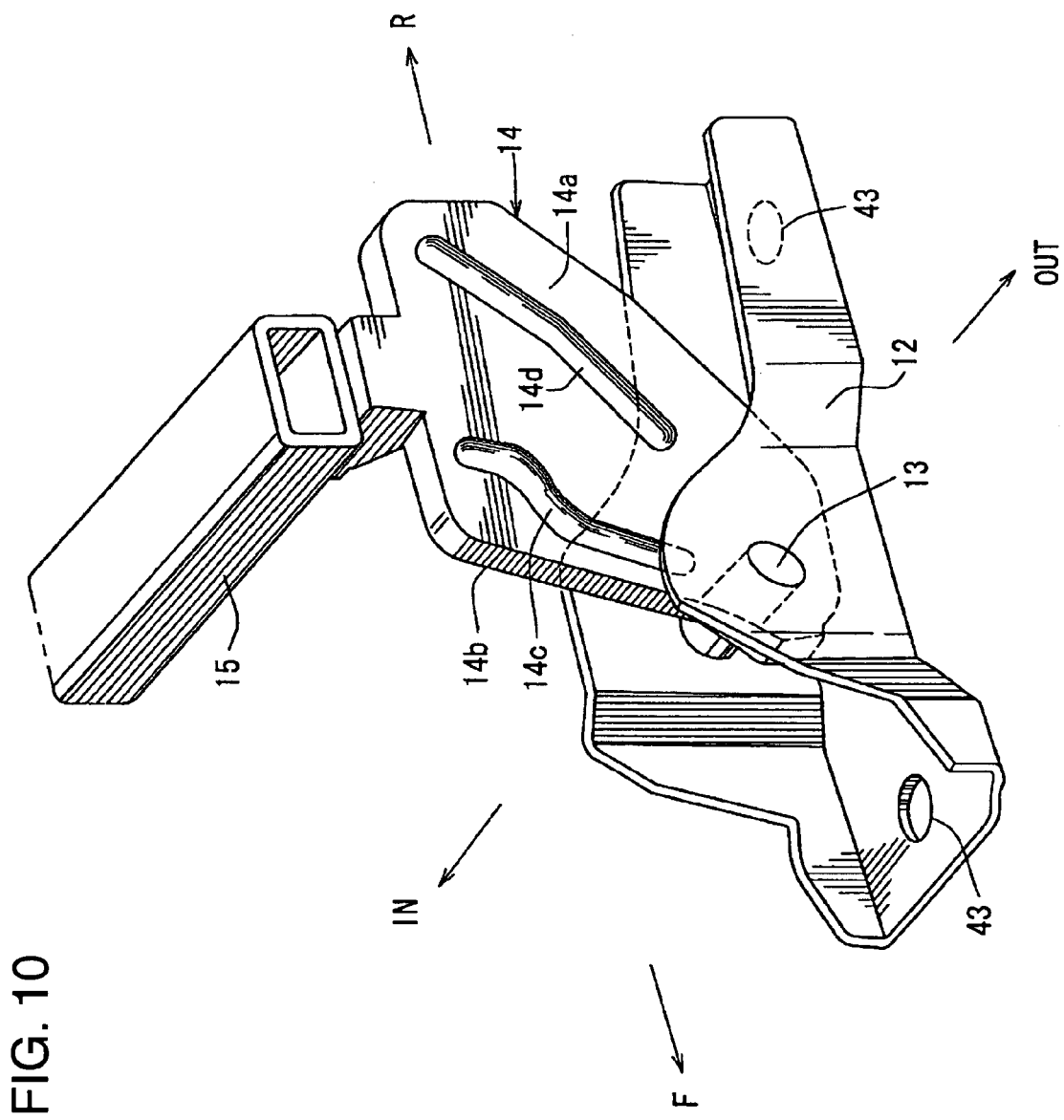
FIG. 10 is a perspective view showing one modification of a mounting mechanism for a seat support frame in the fuel tank arrangement structure.

Furthermore, as shown in FIG. 10, the fixed and movable brackets 12, 14 for mounting the seat support frame 15 to the general surface 8 of the rear floor 4 may be designed as follows.

The fixed bracket 12 is formed to have a U shape in which a longitudinally intermediate portion provided with the pivot shaft 13 is relatively narrowed to provide enhanced rigidity therein, and each of opposite longitudinal end portions formed with bolt insertion holes 43, 43 is relatively widened in consideration of easiness of a bolt fastening operation. The movable bracket 14 pivoted on the fixed bracket 12 comprises a bracket body 14a which is integrally formed with a flange 14b around a periphery thereof and a plurality of beads 14c, 14d to provide enhanced rigidity of the fixed bracket 12 itself and enhanced rigidity for supporting the rear seats. In FIG. 10, the arrows F, R, IN and OUT indicate, respectively, the forward direction, the rearward direction, the inward direction and the outward direction.

With reference to FIGS. 11 to 15, seat arrangements will be described below.

Figure 11:
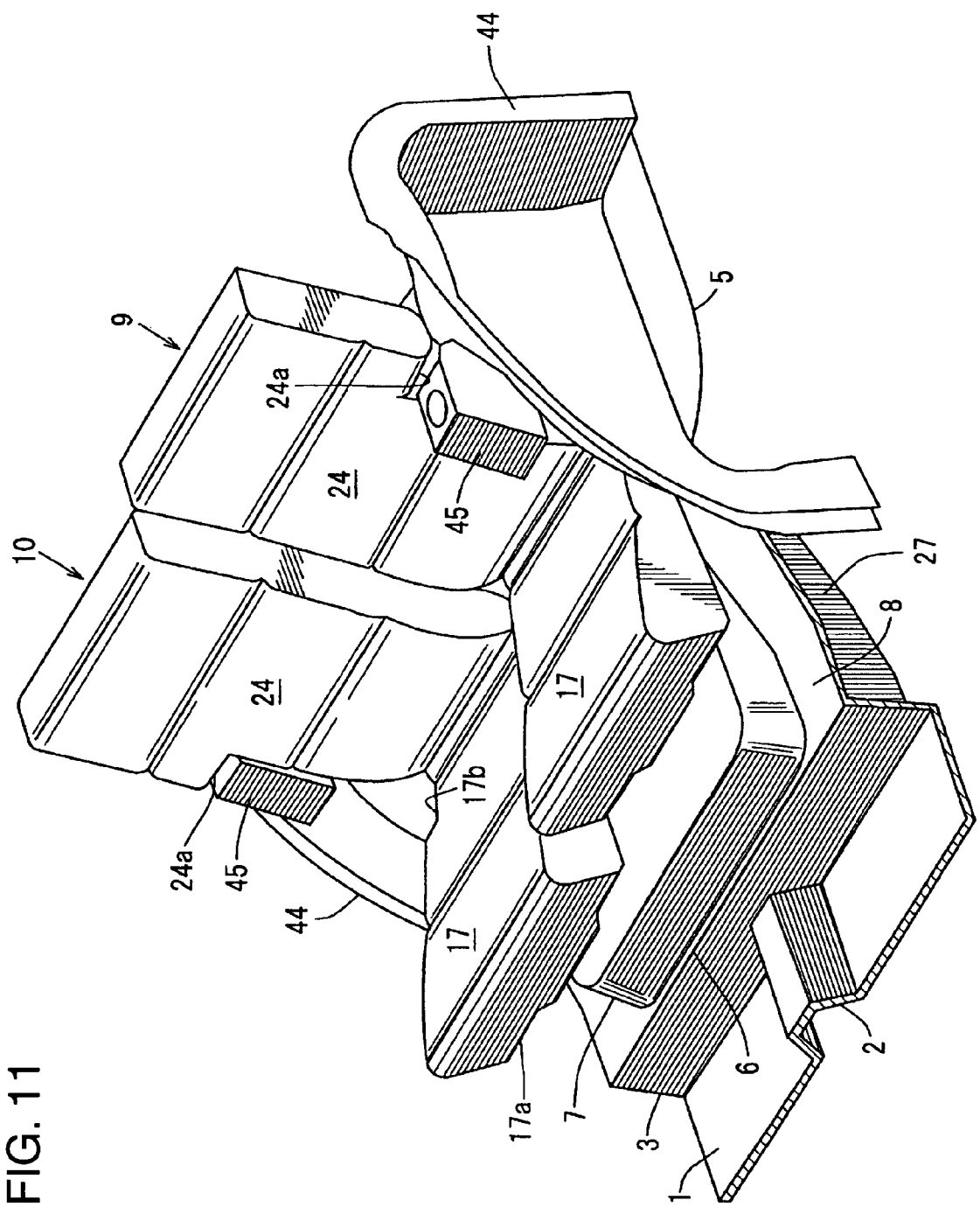
FIG. 11 is perspective view of the fuel tank arrangement structure, wherein one of a pair of rear seats is moved rearward.

As shown in FIG. 11, the right and left rear seats 9, 10 can be slidingly moved in the frontward and rearward directions separately or independently. While FIG. 11 shows the state after the left rear seat 9 is slidingly moved in the rearward direction independently, the right rear seat 10 can also be slidingly moved in the frontward and rearward directions independently. When each of the rear seats 9, 10 is moved in the rearward direction, the concave portion 17b and the concave portion 24a, respectively, formed in the seat cushion 17 and the seatback 24, allow each of the rear seats 9, 10 to avoid interference with the wheel house 44 and the suspension tower 45.

Figure 12:
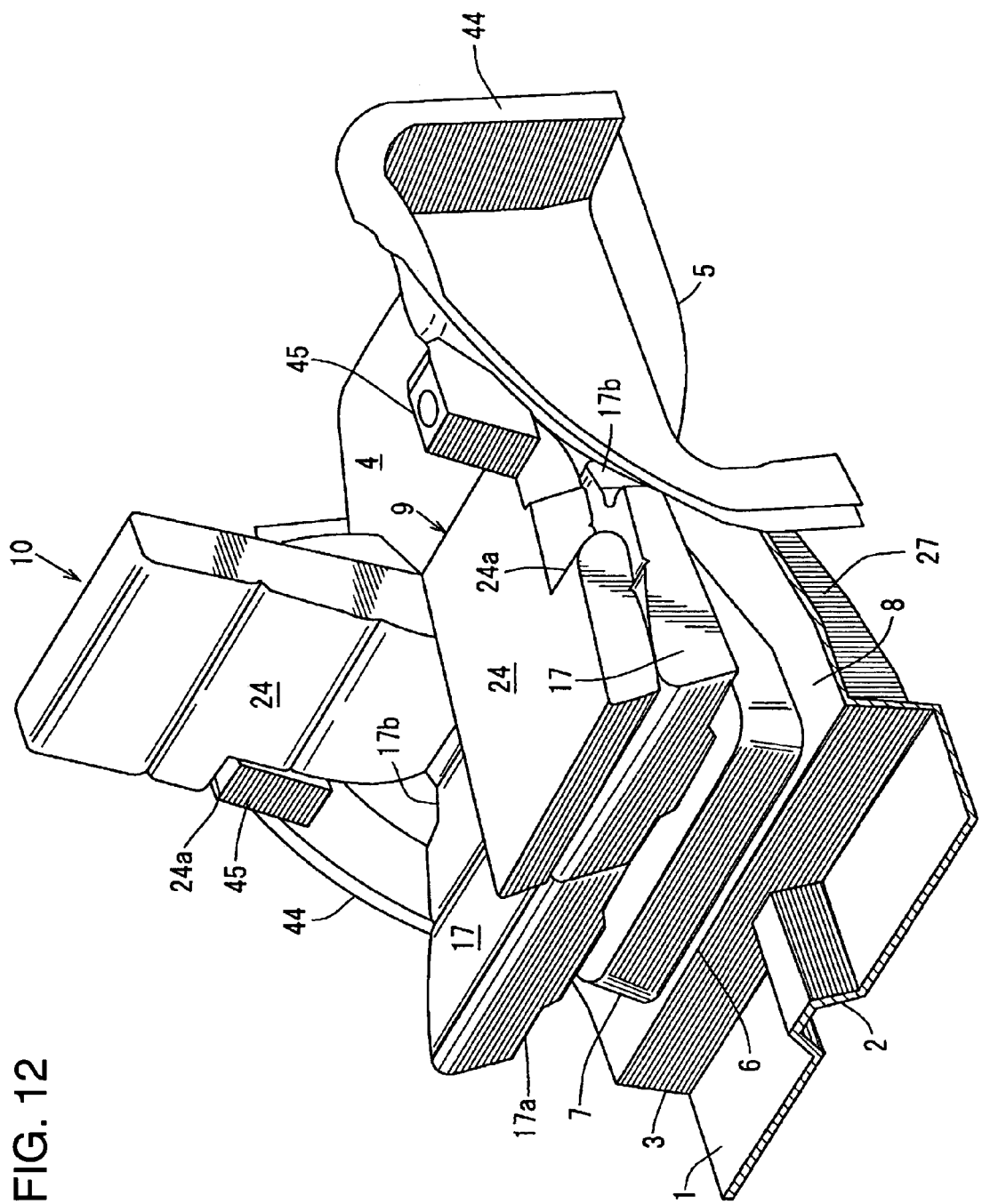
FIG. 12 is perspective view of the fuel tank arrangement structure, wherein one of the rear seats is folded.

As shown in FIG. 12, the seatback 24 in either one of the right and left rear seats 9, 10 may be folded onto the corresponding seat cushion 17 around the reclining pivot point 25 to allow a space above the frontward folded seatback 24 to be effectively utilized as a baggage compartment. While FIG. 12 shows the state after the seatback 24 of the left rear seat 9 is reclined and folded frontward, the seatback 24 of the right rear seat 10 can also be folded frontward independently of the left rear seat 9.

Figure 13:
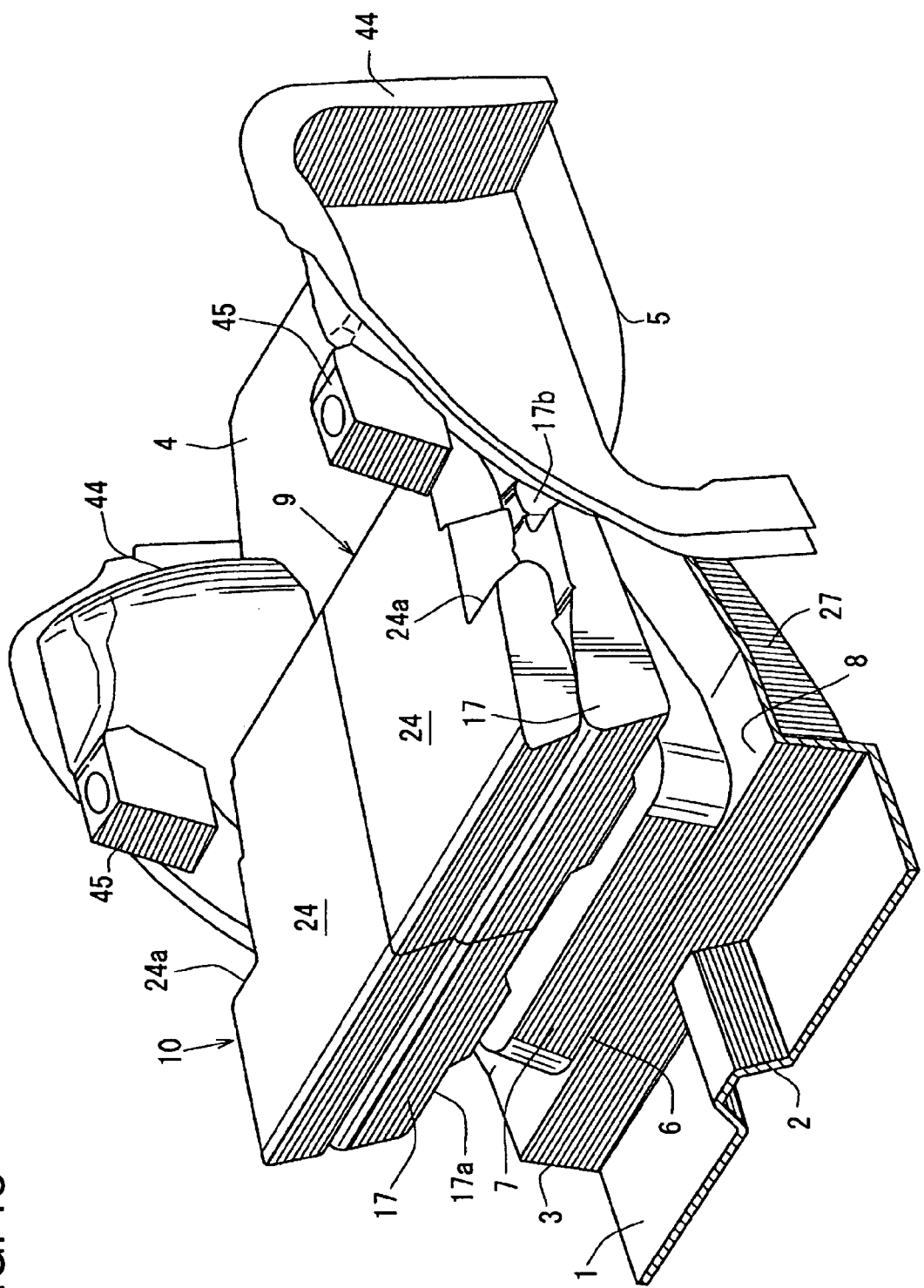
FIG. 13 is perspective view of the fuel tank arrangement structure, wherein both the rear seats are folded.

As shown in FIG. 13, the seatbacks 24, 24 in both of the right and left rear seats 9, 10 may be folded onto the corresponding seat cushions 17, 17 around the reclining pivot point 25 to allow a space above the frontward folded seatbacks 24, 24 to be effectively utilized as a larger baggage compartment.

The pair of right and left rear seats 9, 10 in the position illustrated in FIG. 13 may be rotated frontward around the right and left pivot shafts 13, 13 (see FIG. 2), so that these rear seats 9, 10 can be moved to a storage position together in a folded state. During this operation, the front-side and rear-side seat support frames 15, 16 and the pairs of the seat slide rails 18, 19 are rotated around the pivot shafts 13, 13 together with the rear seats 9, 10.

Figure 16:
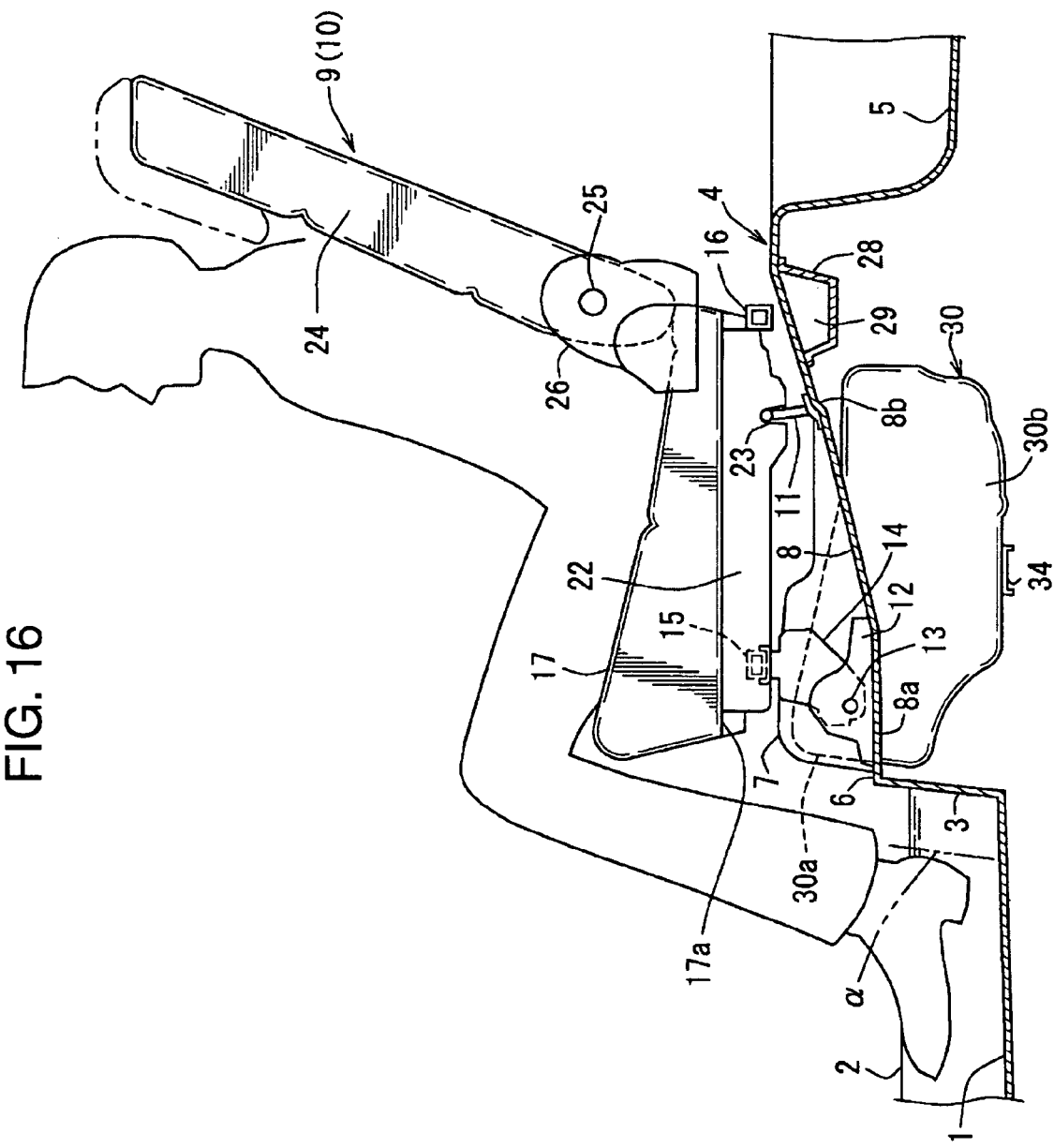
FIG. 16 is an explanatory side view showing a passenger seated in the rear seat and a passenger's foot space in the fuel tank arrangement structure.

FIG. 16 shows the state when a rear-seat passenger is seated in the rear seat 9 (or 10) in a normal seat position. As seen in FIG. 16, the above fuel tank arrangement structure designed to position the rear seats 9, 10 inside the passenger compartment and above the convex rear-floor portion 7 allows a dead space on the lower front side of the rear seats 9, 10 (see, particularly, the seat cushions 17, 17) to be effectively utilized as a foot space for the rear-seat passenger. In particular, even if the kick-up portion 3 is designed to extend rearward from a conventional position a as shown in FIG. 16 to a position indicated by the solid line in FIG. 16, the fuel tank arrangement structure makes it possible to ensure a sufficient capacity of the fuel tank 30.

As mentioned above, the fuel tank arrangement structure according to this embodiment is designed to position the fuel tank 30 under a floor panel (see the floor panel 1 and the rear floor 4) forming a floor of a passenger compartment of a vehicle. In the fuel tank arrangement structure, at least a laterally inward portion of the floor panel (see the rear floor 4) is formed as the convex rear-floor portion 7 protruding upward from the general surface 8 of the floor panel (see the rear floor 4), and at least a laterally inward portion of the fuel tank 30 is formed as the convex fuel-tank portion 30a protruding upward. The convex fuel-tank portion 30a is positioned within the space 31 defined by the convex rear-floor portion 7 while positioning the remaining portion of the fuel tank 30 at a height position lower than the general surface 8 of the floor panel (see the rear floor 4), and the rear seat 9 (10) is positioned inside the passenger compartment and above the convex rare-floor portion 7.

As above, the convex rear-floor portion 7 protruding upward from the general surface 8 of the floor panel (see the rear floor 4) is formed, and the convex fuel-tank portion 30a of the fuel tank 30 is positioned within the space 31 defined by the convex floor portion 7. Thus, this arrangement structure makes it possible to satisfy both needs for ensuring a passenger compartment space, particularly a rear-seat passenger's foot space, and ensuring a capacity of the fuel tank 30.

In addition, the rear seat 9 (10) is positioned inside the passenger compartment and above the convex rear-floor portion 7. Thus, a dead space on the lower front side of the rear seat 9 (10) (see, particularly, the seat cushion 17) can be effectively utilized as a rear-seat passenger's foot space.

In particular, even if the kick-up portion 3 is designed to extend rearward from the conventional position a as shown in FIG. 16 to the position indicated by the solid line in FIG. 16, this fuel tank arrangement structure makes it possible to ensure a sufficient capacity of the fuel tank 30.

Further, the convex rear-floor portion 7 is formed over approximately the entire lateral length of the rear floor panel 4, and the convex fuel-tank portion 30a is formed over approximately the entire lateral length of the fuel tank 30 except for the fuel-pump mounting portion 30c.

This structure makes it possible to provide a larger capacity of the fuel tank while ensuring a rear-seat passenger's foot space.

In the above fuel tank arrangement structure, the floor panel 1 has the kick-up portion 3 extending upward to form the step at a top end thereof, and the convex rear-floor portion 7 is formed at a rearward position relative to the kick-up portion 3.

As above, the convex rear-floor portion 7 is located at a position higher than the kick-up portion 3. Thus, the capacity of the fuel tank 30 can be further increased.

Further, the fuel tank 30 is positioned in a space located rearward relative the kick-up portion 3 and under the rear floor panel 4.

This position of the fuel tank 30 makes it possible to increase a foot space for a passenger seated in the rear seat 9 (10), in the longitudinal and vertical directions, as shown in FIG. 9.

In the above fuel tank arrangement structure, the general surface 8 of the floor panel (see the rear floor 4) is formed to have a slant region inclined downward in the frontward direction, and the rear seat 9 (10) has a front portion mounted to a relatively-low front region (see the lower horizontal front region 8a) of the general surface on the frontward side of the slant region, and a rear portion mounted to a relatively-high rear region (see higher rear region 8b) of the general surface on the rearward side of the slant region.

As above, the general surface of the floor panel (see the rear floor 4) is inclined downward in the frontward direction. Thus, a space for attaching a member required for rotatably supporting the rear seat 9 (10) (e.g. rotating the rear seats 9, 10 together in a folded state) can be reliably created at each of opposite lateral end portions of the floor panel (see the rear floor 4) in front view, and the convex rear-floor portion 7 protruding upward can be adequately formed in the laterally intermediate portion of the floor panel (see the rear floor 4) in front view. This makes it possible to satisfy both the needs for adequately mounting the rear seat 9 (10) and ensuring a sufficient capacity of the fuel tank 30.

Further, the rear seat 9 (10) is attached to the seat support frame 15 which extends laterally and has opposite lateral ends each mounted to the general surface 8 of the floor panel (see the rear floor 4).

In this structure, the rear seat 9 (10) is attached to the seat support frame 15 extending laterally. This makes it possible to ensure enhanced rigidity for supporting the rear seat 9 (10), and provide a larger capacity of the fuel tank 30.

The above fuel tank arrangement structure includes the seat support frame 15 which extends laterally in such as manner as to stride over the convex rear-floor portion 7, and has opposite lateral ends each mounted to the general surface 8 of the floor panel (see the rear floor 4). Further, the rear seat 9 (10) is supported by the seat support frame 15, and an auxiliary component (see the fuel tank 30) for the vehicle is positioned outside the passenger compartment and under the convex rear-floor portion formed in the floor panel (see the rear floor 4).

In this structure, the lateral ends of the seat support frame 15 striding over the convex rear-floor portion 7 are mounted to the general surface 8 of the floor panel (see the rear floor 4). Thus, the upward protrusion of the convex rear-floor portion 7 can be maximized to the extent that it can avoid interference with the seat support frame 15. This makes it possible to provide a space for an auxiliary component while ensuring a given distance from the ground so as to allow a large-size auxiliary component, such as the fuel tank 30 or a silencer, to be adequately positioned. Further, the rear seat 9 (10) is supported by the seat support frame 15. This makes it possible to ensure the rigidity for supporting the rear seat 9 (10). In addition, the lateral ends of the seat frame 15 can be attached in the vicinity of the convex rear-floor portion 7. Thus, the presence of a vertical wall constituting the convex rear-floor portion 7 allows the rigidity for supporting the rear seat 9 (10) to be desirably improved.

Further, the seat support frame 15 is provided with the seat slide rail 18 (19) serving as a seat slider supporting the rear seat 9 (10) slidably in the frontward and rearward directions.

In this structure, the seat slide rail 18 (19) is attached to the seat support frame 15 in the aforementioned structure where the lateral ends of the seat support frame 15 are mounted to the general surface 8 of the floor panel (see the rear floor 4). Thus, the seat slide rail 18 (19) can be arranged while ensuring a height dimension of the convex rear-floor portion 7, to allow the rear seat 9 (10) to be moved in the frontward and rearward directions. That is, the seat slide rail 18 (19) can be attached while ensuring layout efficiency of the convex rear-floor portion 7 and the seat support frame 15.

Further, the fuel tank arrangement structure includes a plural number of the rear seats 9, 10 and plural pairs of the seat slide rails 18, 19. Each of the rear seats 9, 10 is supported by a corresponding one of the pairs of seat sliders 18, 19 slidably in the frontward and rearward directions.

Thus, each of the rear seats 9, 10 can be slidingly moved in the frontward and rearward directions separately or independently to provide enhanced utility.

In the above fuel tank arrangement structure, the seat support frame includes the front-side seat support frame 15 and the rear-side seat support frame 16 which are designed to be mounted to the floor panel (see the rear floor 4), respectively, in a rotatable manner and in a detachable manner, so as to allow the rear seat 9 (10) to be moved in the frontward direction to a storage position.

In comparison between the structural requirements of the present invention and the specific structure in the above embodiment, a floor panel in the present invention corresponds to the floor panel 1 and/or the rear floor 4 in the above embodiment. Further, a convex floor portion, a seat, a relatively-low front region and a seat slider in the present invention correspond, respectively, to the convex rear-floor portion 7, the rear seat 9 (10), the lower front region 8a and the seat slide rail 18 (19) in the above embodiment.

This application claims priority from both Japanese Patent Application Serial Nos. 2004-326039 and 2004-328944, that were filed with Japan Patent Office on Nov. 10, 2004 and Nov. 12, 2004, respectively. Thus, it is deemed that the contents of those Japanese Applications constitute part of the present application as incorporation of reference.

Although the present invention has been described in terms of specific exemplary embodiments, it will be appreciated that various modifications and alterations might be made by those skilled in the art without departing from the spirit and scope of the invention as set forth in the following claims.

What is claimed is:

1. A fuel tank arrangement structure for a vehicle, which is designed to position a fuel tank under a floor panel forming a floor for a passenger compartment of the vehicle, characterized in that:
said floor panel having a general surface;
a convex floor portion which protrudes upward from the general surface; and
a kick-up portion which extends upward to form a step at a top end thereof in such a manner that said general surface extends rearwardly continuously from said top end of the kick-up portion, said convex floor portion is formed at a rearward position relative to said kick-up portion;
said fuel tank has a convex fuel-tank portion protruding upward,
wherein said convex fuel-tank portion is positioned within a space defined by said convex floor portion;
a rear seat is positioned inside said passenger compartment and above said convex floor portion;
the general surface of said floor panel is formed to have a slant region inclined downward in a frontward direction of the vehicle; and
said rear seat has a front portion mounted to a relatively-low front region of said general surface on the frontward side of said slant region, and a rear portion mounted to a relatively-high rear region of said general surface on the rearward side of said slant region.

2. The fuel tank arrangement structure as defined in claim 1, wherein said convex floor portion is formed over approximately the entire lateral length of said floor panel; and
said convex fuel-tank portion is formed over approximately the entire lateral length of said fuel tank except for a mounting portion for a fuel pump.

3. The fuel tank arrangement structure as defined in claim 1, wherein said fuel tank is positioned in a space located rearward relative said kick-up portion and under said floor panel.

4. The fuel tank arrangement structure as defined in claim 1, wherein said rear seat is attached to a seat support frame which extends laterally and has opposite lateral ends each mounted to the general surface of said floor panel.

5. A fuel rank arrangement structure for a vehicle, which is designed to position a fuel tank under a floor panel forming a floor for a passenger compartment of the vehicle, characterized in that:
said floor panel having a general surface;
a convex floor portion which protrudes upward from the general surface; and
a kick-up portion which extends upward to form a step at a top end thereof in such a manner that said general surface extends rearwardly continuously from said top end of the kick-up portion, said convex floor portion is formed at a rearward position relative to said kick-up portion;
said fuel tank has a convex fuel-tank portion protruding upward;
said convex fuel-tank portion is positioned within a space defined by said convex floor portion;
a rear seat is positioned inside said passenger compartment and above said convex floor potion;
a seat support frame which extends laterally in such a manner as to stride over said convex floor portion, and has opposite lateral ends each mounted to the general surface of said floor panel, wherein said rear seat is supported by said seat support frame; and
an auxiliary component for the vehicle is positioned outside said passenger compartment and under said convex floor portion formed in said floor panel.

6. The fuel tank arrangement structure as defined in claim 5, wherein said seat support frame is provided with a seat slider which supports said rear seat slidably in frontward and rearward directions of the vehicle.

7. The fuel tank arrangement structure as defined in claim 6, which includes a plural number of said rear seats and plural pairs of said seat sliders, wherein each of said rear seats is supported by a corresponding one of said pairs of seat sliders slidably in said frontward and rearward directions.

8. The fuel tank arrangement structure as defined in claim 5, wherein said seat support frame includes a front-side seat support frame and a rear-side seat support frame which are designed to be mounted to said floor panel, respectively, in a rotatable manner and in a detachable manner, so as to allow said rear seat to be moved in said frontward direction to a storage position.

* * * * *